United States Patent [19]

Hurth

[11] Patent Number: 4,991,465
[45] Date of Patent: Feb. 12, 1991

[54] AUTOMATIC CONTROL DEVICE FOR THE GEARSHIFT OF INDUSTRIAL VEHICLES

[75] Inventor: Fritz C. A. Hurth, Montagnola, Switzerland

[73] Assignee: Hurth Axle S.p.A., Trento, Italy

[21] Appl. No.: 343,487

[22] Filed: Apr. 25, 1989

[30] Foreign Application Priority Data

Apr. 27, 1988 [IT] Italy .............................. 20350 A/88

[51] Int. Cl.⁵ ............................................ B60K 41/06
[52] U.S. Cl. ........................................ 74/866; 74/335
[58] Field of Search ................... 74/866, 335, 336 R, 74/337; 76/869; 364/424.1

[56] References Cited

U.S. PATENT DOCUMENTS

| | | | |
|---|---|---|---|
| 3,961,546 | 6/1976 | Gilmore et al. | 74/866 |
| 4,155,277 | 5/1979 | Minami et al. | 74/866 |
| 4,187,739 | 2/1980 | Hamma et al. | 74/732 |
| 4,269,281 | 5/1981 | Schneider et al. | 74/866 X |
| 4,414,863 | 11/1983 | Heino | 74/866 |
| 4,563,917 | 1/1986 | Higashi et al. | 74/866 |
| 4,658,676 | 4/1987 | Furusawa et al. | 74/866 |
| 4,702,127 | 10/1987 | Cote | 364/424.1 X |
| 4,730,519 | 3/1988 | Nakamura et al. | 74/866 |
| 4,796,485 | 1/1989 | Ebina | 74/335 X |
| 4,845,621 | 7/1989 | Kawata et al. | 364/424.1 X |

FOREIGN PATENT DOCUMENTS 0174560 3/1986 European Pat. Off. .
0175192 3/1986 European Pat. Off. .

Primary Examiner—Dwight Diehl
Attorney, Agent, or Firm—Dressler, Goldsmith, Shore, Sutker & Milnamow, Ltd.

[57] ABSTRACT

An automatic control device for the gearshift of industrial vehicles, in particular of the type suitable for automatically controlling a two-speed gearshift with engagement under torque actuated by a hydraulic motor. In order to avoid undesirable rapid decelerations of the vehicle while shifting from the second to the first gear, an element for delaying the engagement of the related gear is inserted between the electronic control system, generating the activation pulses for the solenoids which actuate the engagement of the clutches related to the two gears, and at least the control solenoid of the first gear. The delay is preferably preset according to the characteristics of the vehicle and of the gearshift.

5 Claims, 1 Drawing Sheet

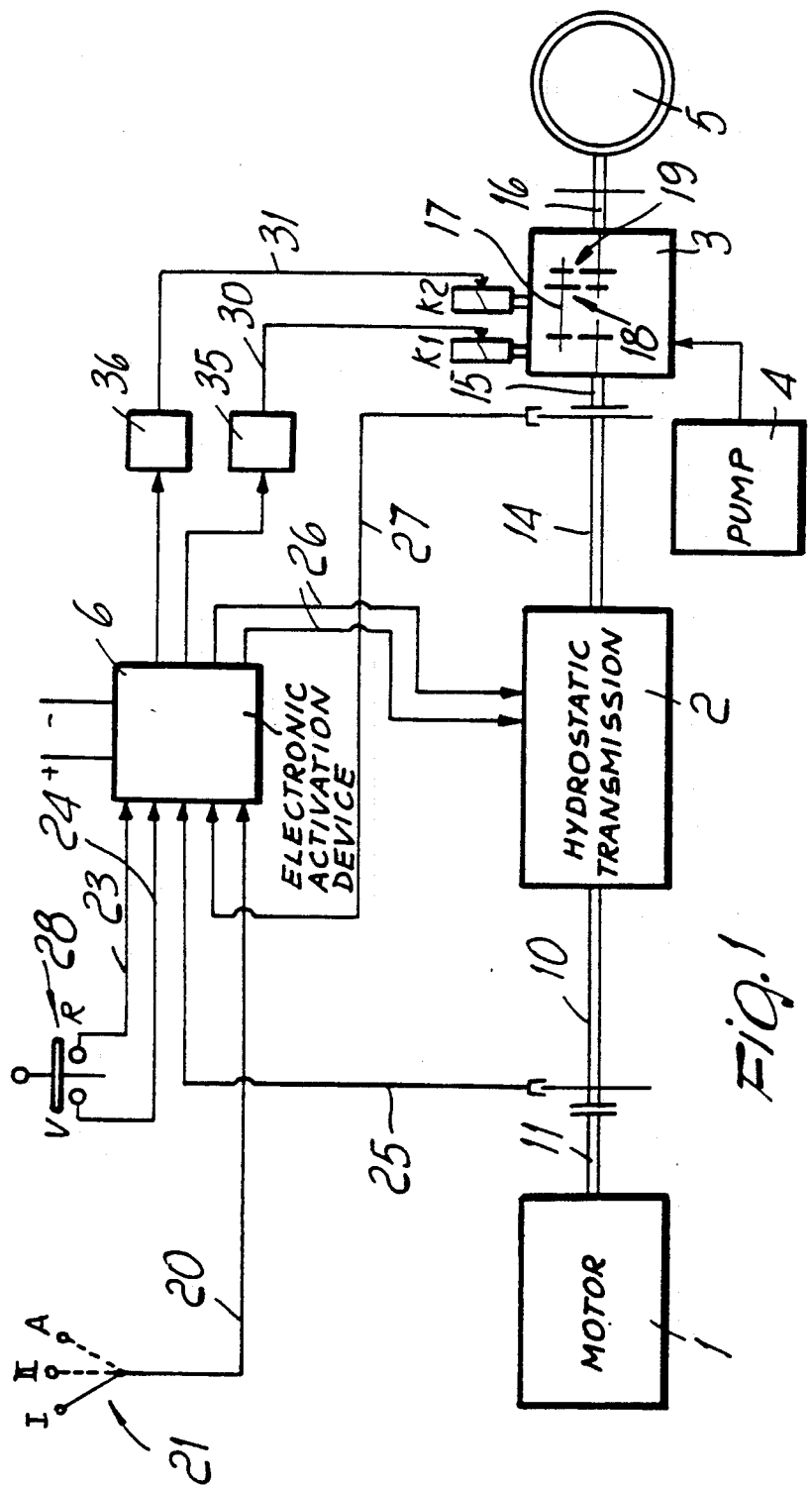

AUTOMATIC CONTROL DEVICE FOR THE GEARSHIFT OF INDUSTRIAL VEHICLES

BACKGROUND OF THE INVENTION

The present invention relates to an automatic control device for the gearshift of industrial vehicles, such as loaders, excavators, lift trucks and the like, and in particular it relates to a device for controlling an automatic two-speed gearshift with coupling under torque for hydrostatic transmissions.

As is known, in order to move industrial vehicles equipped with an automatic gearshift of the described type, an endothermal motor actuates a differential axle for driving the vehicle by means of a hydrostatic transmission and of an automatic gearshift. The hydrostatic transmission generally comprises a variable-capacity hydrostatic pump connected to the output shaft of the endothermal motor and a variable-capacity hydrostatic motor which is actuated by the hydrostatic pump; the output shaft of said motor is connected to the differential axle by means of the gearshift, for example of the three-shaft type, comprising hydraulically actuated clutches so as to obtain two different speed ratios between the input shaft and the output shaft of said gearshift. The clutches (of the disk type) are actuated by means of an external constant-capacity hydraulic pump which feeds the pressurized oil intended to pack the disks of one of the two clutches and therefore engage one of the two gears. Feeding of pressurized oil to one clutch or the other (and therefore the engagement of one or the other of the gears) is caused by means of two solenoids controlled by an electronic actuation device appropriately connected to the operator's controls (allowing him to choose between manual or automatic operation of the gearshift and to control the direction of motion) and to the endothermal motor, to the hydrostatic transmission and to the gear control solenoids, so as to control the direction of rotation of the transmission's output shaft (and therefore the direction of motion) and generate appropriate energization and de-energization signals for the clutch control solenoids, in a per se known manner, according to the power of the motor and to the speed of the vehicle.

This automatic control system operates satisfactorily and is very reliable, but it is not free from disadvantages. When passing from the second gear to the first, in fact, it is not capable of ensuring a gradual speed reduction, and indeed it causes a sharp deceleration of the vehicle which is considered unpleasant and unacceptable by the vehicle's user.

Various solutions have been studied and tested in order to eliminate this problem, some of which entail complicated modifications of the electronic control part so as to actuate the solenoids (and therefore the respective clutches) only when the speeds of the disks of the first gear's clutch are identical. However, even these solutions have not solved the problem completely and have not eliminated the undesirable deceleration during gear shifting; said solutions furthermore entail considerable and expensive modifications of the elements of the transmission system, especially in the electronic control section.

SUMMARY OF THE INVENTION

The aim of the present inventin is therefore to provide an automatic control device for the gearshift of industrial vehicles which eliminates the disadvantages of the prior art.

Within this aim, a particular object of the present invention is to provide an automatic control device for the gearshift of industrial vehicles which allows a gradual deceleration of the vehicle even when shifting automatically from the second gear to the first.

Another object of the present invention is to provide an automatic control device for the gearshift of indusrial vehicles which can be easily adapted to motion transmission systems of various kinds and to different industrial vehicles.

Not least object of the present invention is to provide an automatic control device for the gearshift of industrial vehicles in which the section adapted to allow the soft gear shifting is extremely simple and therefore economical, can be easily inserted and connected to the other components of the automatic transmission system without requiring modifications thereof and gives the greatest assurances of safety and reliability in use.

This aim, the objects mentioned and others which will become apparent hereinafter are achieved by an automatic control device for the gearshift of industrial vehicles, as defined in the accompanying claims.

BRIEF DESCRIPTION OF THE DRAWINGS

The characteristics and advantages of the automatic control device for the gearshift of industrial vehicles, according to the invention, are described hereafter on the basis of the description of a preferred but not exclusive embodiment, illustrated only by way of non-limitative example in the accompanying drawings, wherein:

FIG. 1 is a simplified block diagram of the drive system equipped with an automatic gearshift device according to the invention; and FIGS. 2a and 2b plot the behavior of the pressure of the oil for the engagement of the clutches, respectively according to the prior art and according to the invention.

DESCRIPTION OF THE PREFERRED EMBODIMENTS

With reference to FIG. 1, the reference numeral 1 indicates the endothermal motor intended to actuate, through a hydrostatic transmission 2 and a gearshift 3, the differential axle connected to the wheels for the movement of the vehicle. The hydrostatic transmission 2 may be of any kind, for example of the kind indicated in the introduction of the present description, and may therefore have a variable-capacity hydrostatic pump connected with its input shaft 10 to the output shaft 11 of the motor 1 and a variable-capacity hydrostatic motor controlled by the hydrostatic pump, the output shaft 14 whereof is connected to the input shaft of the gearshift 3. Said gearshift 3 may in turn be of the type with three shafts, of which the figure illustrates the input shaft 15 and the output shaft 16 and, schematically, intermediate shaft 17, and comprise two clutches, schematically shown at 18, 19, which are hydraulically actuated by the pressure of the oil fed by the pump 4, which is preferably of the constant-capacity hydraulic type. In a per se known manner, feeding of the pressurized oil to one clutch or the other is controlled by electromagnetic valves (solenoids) K1, K2, respectively for the first gear and for the second gear, which are in turn controlled by an electronic control system indicated by the reference numeral 6.

In detail, the electronic control system 6, which is of a known type and is therefore not described with regard to its internal structure, is connected through line 20 to a control lever 21 which can be actuated by the operator so as to manually select the first gear and the second gear (as indicated in the figure by I and II) or to enable the automatic gearshift system (position A). The electronic unit 6 is furthermore connected, through lines 23 and 24, to a lever 28 for selecting the direction of motion (in which position V indicates forward motion, while position R indicates reverse motion; a neutral position is also possible). Further connection lines 25, 26 and 27 respectively allow the electronic unit 6 to detect the speed of the motor 1, to send the motion direction signal to the hydrostatic transmission 2 and to detect the speed of the gearshift 3 while the lines 30 and 31 are intended to feed respectively the solenoid K1 of the first gear and the solenoid K2 of the second gear with control signals.

So far the described transmission system corresponds to a conventional structure, in which, as mentioned, there is the severe disadvantage of a sharp deceleration of the vehicle when shifting gears from the second to the first.

According to the invention, a timer 35 is inserted at least on the control line 30 of the solenoid related to the first gear in order to eliminate the deceleration during gear shifting; said timer has the purpose of delaying the energization of the solenoid K1 and therefore the engagement of the first gear after the electronic control unit 6 has sent apposite control signals for shifting from the second gear to the first.

The timer 35 has a delay which must be chosen according to the difference between the gear ratios of the first and second gears, according to the kind of vehicle on which the transmission system is installed and according to the purpose for which the vehicle is intended. Therefore said timer is preferably of the adjustable type, to allow it to adapt its delay to the specific vehicle. For example, the electronic timer manufactured by the company CARLO GAVAZZI and identified by the code H3BA can be used for this purpose. In general, delays comprised between 0.20 and 0.25 tenths of a second have proved to be sufficient to eliminate the deceleration observed in known solutions.

In the illustrated embodiment, a timer 36 has been furthermore inserted on the control line 31 of the solenoid for the second gear, as may be convenient in certain applications.

The operation of the device according to the invention is clearly apparent from the preceding description and is evident from the comparison of the plots shown in FIGS. 2a and 2b. In particular, FIG. 2a plots the pressure of the oil fed to the clutches to pack the related disks and engage one of the two gears with a conventional control, with no delay between transmission of the control signal by the electronic unit 6 and the corresponding actuation of the clutch. The upper horizontal portion of curve (corresponding to a pressure of 23 bar) represents the condition in which the clutch is engaged (alternately the first or the second), while the descending portion of the curve (down to the minimum value of 0.5 bar) corresponds to the condition in which the gears are shifted, when the solenoid related to the previously engaged gear is de-energized and the other solenoid is then energized. In this case there is no delay, and the pressure of the oil, after reaching its minimum value, rapidly rises again to engage the next gear. On the contrary, FIG. 2b plots the behaviour of the oil pressure if a timer adapted to generate a delay of 0.2 sec is inserted. As can be seen, in this case, after the upper portion of the curve and the drop of the oil pressure due to the disengagement of the previous gear, the pressure of the oil remains at its minimum value, which corresponds to the state in which both clutches are disengaged, for a time interval which is linked to the set delay, thereby avoiding the undesired sharp deceleration of the vehicle.

As can be seen from the above solution, the invention fully achieves the proposed aim. It is in fact possible to completely eliminate the above described deceleration with a simple and economical solution which requires no modification to any part of the known transmission system but only the insertion of a delay element between the electronic control unit and the clutch engagement solenoids. According to tests performed by the Applicant, it is possible to achieve a gentle shift, with no sudden deceleration of the vehicle, by appropriately selecting the delay time, which can be selected by performing ordinary routine tests, by virtue of the automatic and gradual reduction of the speed of the output shaft gear to approximately half the speed corresponding to the first gear, providing an optimum operation of the vehicle.

The invention thus conceived is susceptible to numerous modifications and variations, all of which are within the scope of the inventive concept. In particular, the fact is stressed that though the delay timer has been inserted on the control line of the first gear and of the second gear in the example illustrated in FIG. 1, it is in general sufficient to insert it only on the line of the first gear. The selected timer may furthermore be of the more complicated adjustable type, as indicated, or may even be a simpler device with a fixed delay, the delay value whereof is permanently preset before installation according to the kind of vehicle and of gearshift. Though the solution illustrated with the timer connected on the activation line between the electronic unit 6 and the solenoids is particularly simple, since it requires no modification of the other components, said timer may furthermore be included in the electronic unit itself.

All the details may furthermore be replaced with other technically equivalent elements.

I claim:

1. An automatic control device for gearshifts of industrial vehicles, comprising an actuation motor, a gearshift including at least a first and a second gears and having an input shaft, a transmission interposed between said actuator motor and said input shaft, first and second electromagnetic elements controlling alternate engagement of said first and said second gears, an electronic control device connected to said electromagnetic elements through respective connection lines and generating first and second engagement signals for selectively and respectively activating said first and second electromagnetic elements, and a delay element arranged externally with respect to said electronic control device, on one of said connection lines, between said electronic control device and said first electromagnetic element for delaying said first engagement signal generated by said electronic control device and fed to said first electromagnetic element.

2. A device according to claim 1, further comprising a second delay element arranged externally with respect to said electronic control device, on a further one of said connection lines, between said electronic control device and said second electromagnetic element for delaying said second engagement signal.

3. A device according to claim 1, wherein said delay element is a timer.

4. A device according to claim 3, wherein said timer is variable.

5. An automatic control device for gearshifts of industrial vehicles, comprising an actuation motor, a gearshift including at least a first and a second gears and having an input shaft, a transmission interposed between said actuator motor and said input shaft, first and second electromagnetic elements controlling alternate engagement of said first and said second gears, an electronic control device connected to said electromagnetic elements through respective connection lines and generating first and second engagement signals for selectively and respectively activating said first and second electromagnetic elements, and a delay element arranged externally with respect to said electronic control device, on one of said connecting lines, between said electronic control device and said first electromagnetic element for delaying said first engagement signal generated by said electronic control device and fed to said first electromagnetic element, wherein said delay element is a variable timer.

* * * * *